United States Patent
Yopp

(10) Patent No.: US 7,069,130 B2
(45) Date of Patent: Jun. 27, 2006

(54) PRE-CRASH SENSING SYSTEM AND METHOD FOR DETECTING AND CLASSIFYING OBJECTS

(75) Inventor: Wilford T. Yopp, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/707,377

(22) Filed: Dec. 9, 2003

(65) Prior Publication Data

US 2005/0125126 A1 Jun. 9, 2005

(51) Int. Cl.
*B60Q 1/00* (2006.01)
*G06F 17/00* (2006.01)
(52) U.S. Cl. ............................ 701/45; 701/96; 382/103
(58) Field of Classification Search .................. 701/45, 701/96, 301; 382/103, 190, 228, 106, 224; 342/109, 64, 70, 71; 340/435, 436, 937, 340/903, 917
See application file for complete search history.

(56) References Cited

U.S. PATENT DOCUMENTS

| | | | |
|---|---|---|---|
| 4,799,270 A | 1/1989 | Kim et al. | |
| 5,287,110 A | 2/1994 | Tran | |
| 5,689,264 A * | 11/1997 | Ishikawa et al. | 342/70 |
| 5,963,653 A | 10/1999 | McNary et al. | |
| 6,085,151 A * | 7/2000 | Farmer et al. | 701/301 |
| 6,115,702 A | 9/2000 | Reiser et al. | |
| 6,519,519 B1 | 2/2003 | Stopczynski | |
| 6,794,987 B1 * | 9/2004 | Schiffmann et al. | 340/435 |
| 6,838,980 B1 * | 1/2005 | Gloger et al. | 340/435 |
| 2002/0151297 A1 | 10/2002 | Rembroski et al. | |
| 2003/0018928 A1 | 1/2003 | James et al. | |
| 2003/0065432 A1 | 4/2003 | Shuman et al. | |

FOREIGN PATENT DOCUMENTS

WO WO 02/094618 A1 11/2002

* cited by examiner

*Primary Examiner*—Dalena Tran
(74) *Attorney, Agent, or Firm*—Frank A. MacKenzie

(57) ABSTRACT

One embodiment of the present invention is a pre-crash sensing system (12) ("PCS system") for a vehicle (18) for processing images within a substantially quick time. This system (12) includes one or more sensors (14) for detecting one or more objects (16) that are located external to the vehicle (18). These sensors (14) are coupled to a controller (22) for transmitting data associated with a detected object (16) to the controller (22). The controller (22) utilizes an algorithm to store this data and the object's identity. Also, the controller (22) utilizes the algorithm to classify the object into a predetermined category when the controller (22) determines that the object (16) requires classification.

21 Claims, 2 Drawing Sheets

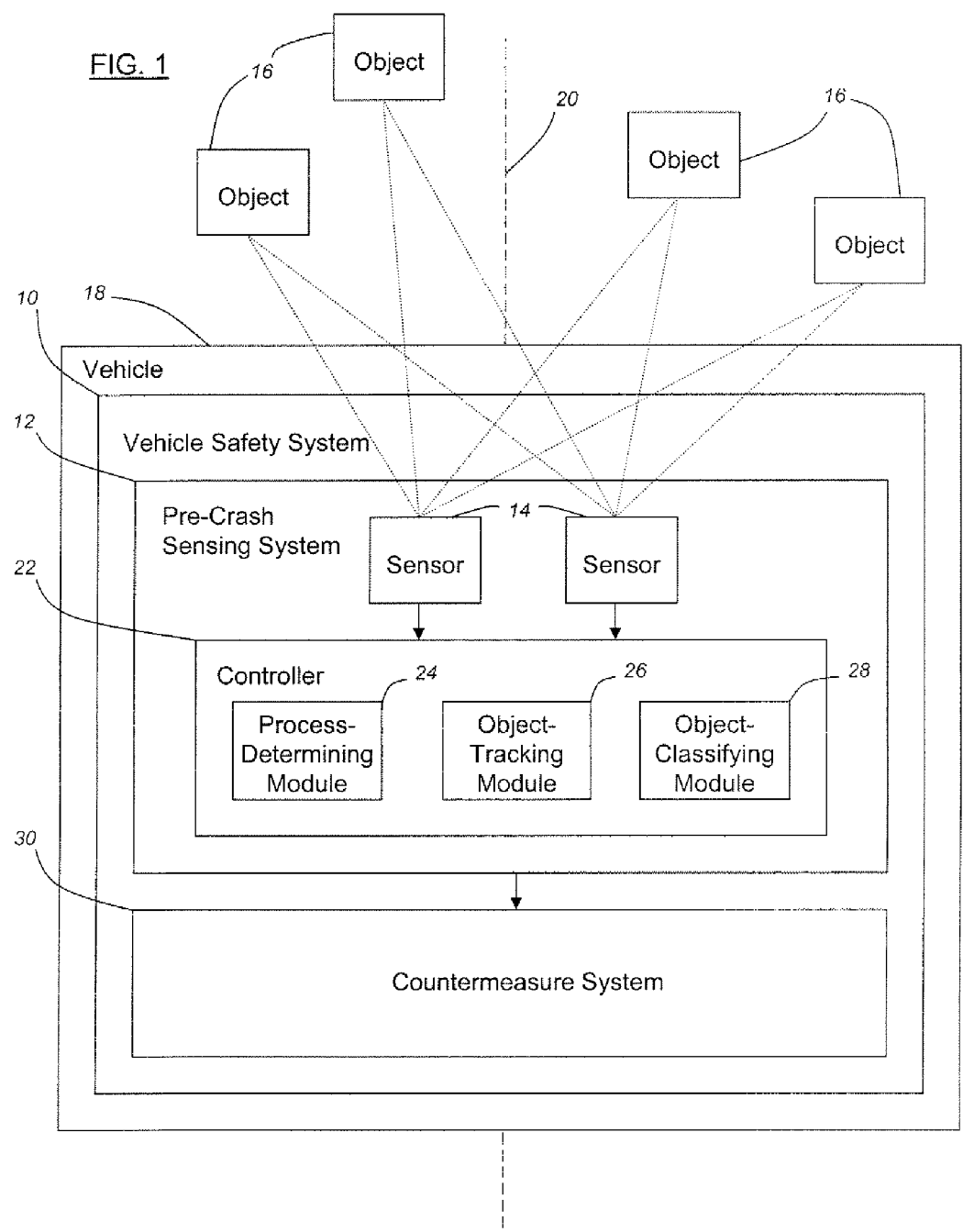

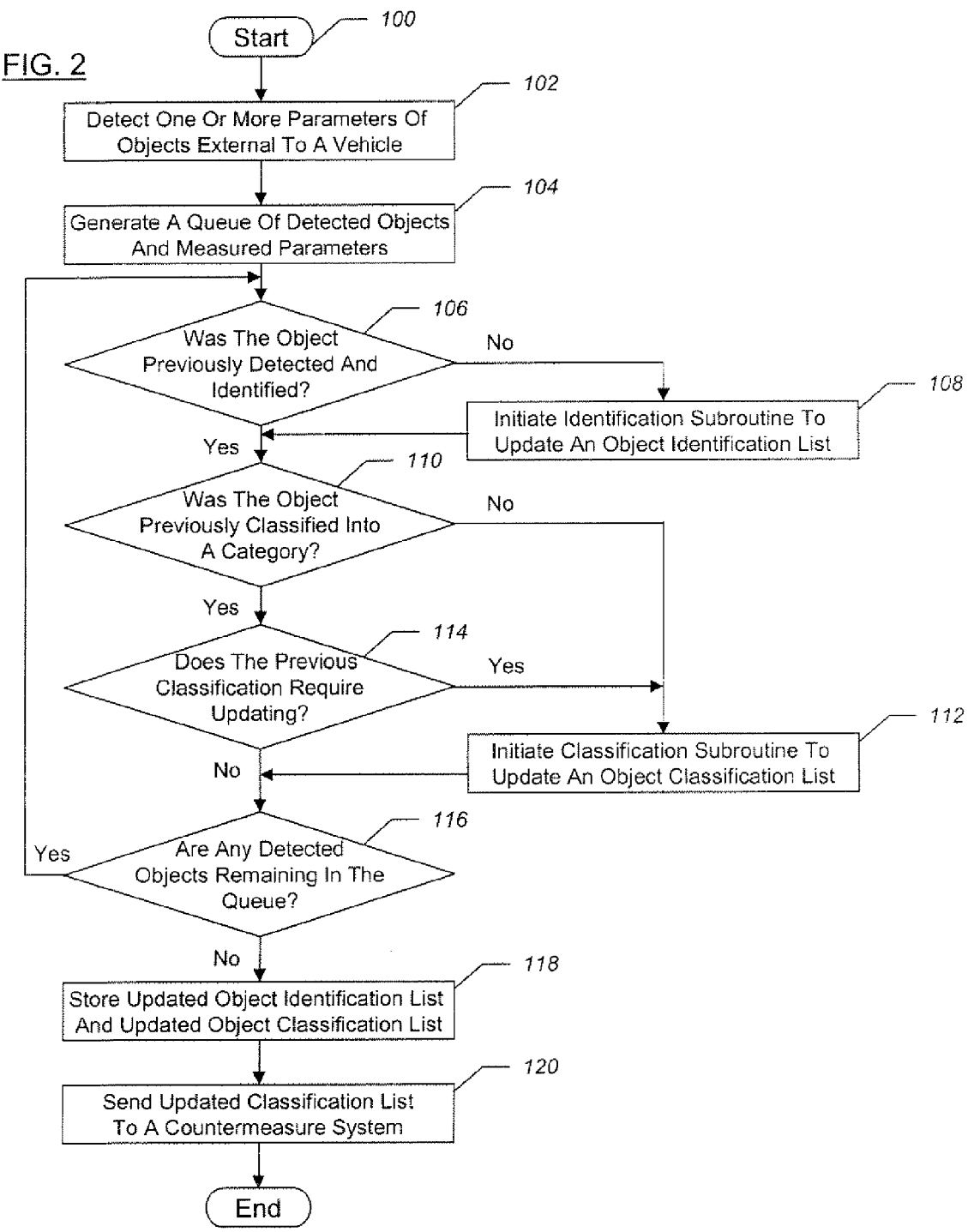

PRE-CRASH SENSING SYSTEM AND METHOD FOR DETECTING AND CLASSIFYING OBJECTS

BACKGROUND OF INVENTION

The present invention relates generally to pre-crash sensing systems for vehicles, and more particularly to a pre-crash sensing system and method for processing images within a substantially quick period of time.

Vehicle safety systems typically include pre-crash sensing ("PCS") systems and countermeasure systems, which are actuated by the PCS systems.

The PCS systems ordinarily utilize one or more sensors for detecting and/or measuring objects located external to the vehicle. Specifically, typical PCS systems utilize the sensors to indiscriminately and simultaneously detect every object within the sensor's field of detection during each sensing cycle. These sensors typically are coupled to a controller or microprocessor for sending various kinds of input data to the controller. This controller usually processes the input data for identifying the objects and classifying these objects into predetermined categories.

In so doing, the controller can utilize an intricate algorithm or process for analyzing the input data. This algorithm requires a predetermined amount of computational power and speed from the controller. It is understood that the presence and detection of multiple objects can increase the amount of power and speed required from the controller in order for the PCS system to operate properly.

It would be desirable to provide a PCS system and method for identifying and classifying objects with even greater speed and efficiency than existing PCS systems.

SUMMARY OF INVENTION

One embodiment of the present invention is a pre-crash sensing system for a vehicle, which processes images within a substantially quick time. This system includes one or more sensors for detecting one or more objects that are located external to the vehicle. These sensors are coupled to a controller for transmitting data associated with an object to the controller. The controller utilizes an algorithm to store this data and the object's identity when the controller determines that the object was not previously detected and/or identified by the system. Also, the controller utilizes the algorithm to classify the object into a predetermined category when the controller determines that the object requires classification.

One advantage of the present invention is that a pre-crash sensing system is provided that selectively identifies and/or classifies detected objects on an as-needed basis so as to decrease computational requirements of the system's controller and to enhance overall performance of the system.

Another advantage of the present invention is that a method for processing images is provided that can utilize substantially low-powered microprocessors and thus decrease the costs of the systems.

Yet another advantage of the present invention is that a pre-crash sensing system is provided that can utilize two or more low-cost, specialized sensors for taking substantially accurate measurements.

Other advantages of the present invention will become apparent upon considering the following detailed description and appended claims, and upon reference to the accompanying drawings.

BRIEF DESCRIPTION OF DRAWINGS

For a more complete understanding of this invention, reference should now be made to the embodiments illustrated in greater detail in the accompanying drawings and described below by way of the examples of the invention:

FIG. 1 is a schematic diagram of a vehicle safety system including a pre-crash sensing system, according to one advantageous embodiment of the claimed invention; and FIG. 2 is a logic flow diagram of a method for operating the pre-crash sensing system shown in FIG. 1, according to one advantageous embodiment of the claimed invention.

DETAILED DESCRIPTION

In the following figures, the same reference numerals are used to identify the same components in the various views.

The present invention is particularly suited for a pre-crash sensing system integrated within a vehicle. In this regard, the embodiments described herein employ structural features where the context permits. However, it is understood that a variety of other embodiments without the described features are contemplated as well. Moreover, it is also contemplated that the method for operating the pre-crash sensing system can be utilized for various other suitable systems. For this reason, it follows that the invention can be carried out in a variety of other modes and utilized for other suitable applications as desired.

Referring to FIG. 1, there is shown a schematic diagram of vehicle safety system 10 ("VS system") having a pre-crash sensing system 12 ("PCS system"), according to one advantageous embodiment of the claimed invention. The PCS system 12 includes a series of sensors 14 for detecting one or more objects 16 located external to the vehicle 18. For example, these sensors 14 can be positioned in forward-looking orientations for sensing objects in the vehicle's path. However, it will be appreciated that the sensors 14 can be positioned in other suitable orientations as desired. It is also understood that the PCS system 12 can instead utilize only one sensor while still providing efficient image processing by way of the algorithm detailed in the description for FIG. 2.

Referring back to FIG. 1, the sensors 14 are utilized for detecting one or more parameters associated with each object 16. These parameters can include the object's height, width, depth, range, range rate, angle, various other suitable visual features or cues, or any combination thereof. The range of an object 16 is the distance between the object 16 and the vehicle 18. Similarly, the range rate is the change in distance between the object 16 and the vehicle during a unit change in time. Also, the angle is a measurement of the angular displacement of the object from a centerline 20 of the vehicle 18.

In this embodiment, the sensors 14 are comprised of one or more visual-imaging cameras and one or more electromagnetic wave-ranging devices. In this way, the visual-imaging cameras and the wave-ranging devices can be utilized in combination for detecting all the desired parameters of each object. For instance, the visual-imaging cameras can be utilized for detecting each object's height, width, angle, and other visual features while the wave-ranging devices can be utilized for detecting the object's range, range rate, coarse width, and angle information.

Specifically, the visual-imaging cameras preferably are monocular for accurately detecting each object's height, width, angle, and other visual feature information. A person of ordinary skill in the art will understand that the monocular cameras may not be as accurate as binocular cameras in measuring range and range rate. However, these monocular cameras can be substantially less expensive than the binocular cameras. Of course, it will be appreciated that binocular cameras can instead be utilized as desired.

Further, as mentioned above, the wave-ranging devices are utilized for detecting the object's range, range rate, coarse width, and angle information. In this regard, the wave-ranging devices can accurately measure parameters, which are not easily and/or accurately detected by the visual-imaging cameras. In one embodiment, these wave-ranging devices are radar devices. However, the wave-ranging devices can instead be lidar devices, stereo camera pair ranging devices, various other suitable wave-ranging devices, or any combination thereof as desired.

As is known in the art, there exist certain wave-ranging devices that can accurately detect all of the aforementioned parameters, including height and width, without the aid of visual-imaging cameras. However, similar to the binocular cameras, these wave-ranging devices can be substantially expensive. For this reason, the less sophisticated and more cost-beneficial wave-ranging devices can be utilized with the visual-imaging cameras to collectively provide all the desired parameters at lower costs than the higher technology wave-ranging devices. In addition, a person of ordinary skill in the art will understand that utilizing two or more different devices for detecting the same parameters can substantially improve the accuracy of the measurements.

This "sensor fusion" feature is beneficial because it enables the PCS system 12 to utilize low-cost, specialized sensors 14 in combination for accurately detecting all the desired parameters of the objects 16.

In further accordance with the invention, each sensor 14 is coupled to a controller 22. This controller 22 preferably is a microprocessor including a process-determining module 24, an object-tracking module 26, and an object-classifying module 28. The functions of each of these modules are exemplified in detail in the description for FIG. 2.

The controller 22 is coupled to one or more countermeasure systems 30 in the vehicle 18. The countermeasure systems 30 can be active and/or passive as desired. The active countermeasure systems may include a brake control system, a throttle control system, a steering control system, a suspension control system, a transmission control system, various other chassis control systems, or any combination thereof.

The passive countermeasure systems can include an internal airbag control system, a pedestrian protection control system, an external airbag control system, a seatbelt control system, a knee bolster control system, a head restraint control system, a load-limiting pedal control system, a load-limiting steering control system, a pretensioner control system, other suitable systems, or any combination thereof. The pretensioner control system may provide control over pyrotechnics and seatbelt pretensioners. Furthermore, the airbag control system may provide control over front airbags, side airbags, curtain airbags, hood airbags, various other airbags, or any combination thereof. Also, the pedestrian protection control system can include control over a deployable hood, a bumper system, various other protection devices, or any combination thereof.

Referring now to FIG. 2, there is shown a logic flow diagram of a method for operating the PCS system 12 shown in FIG. 1, according to one advantageous embodiment of the claimed invention. The method begins in step 100 and immediately proceeds to step 102.

In step 102, one or more sensors 14 detect one or more desired parameters of each object 16 within the sensors" field of detection external to the vehicle 18. This step preferably is accomplished by utilizing a "sensor fusion" approach with a combination of one or more visual-imaging cameras and one or more electro-magnetic wave-ranging devices. Specifically, the cameras are utilized for detecting each object's height, width, angle, and other visual feature information while the wave-ranging devices are utilized for detecting the object's range, range rate, coarse width, and angle information. In this way, low-cost, specialized sensors 14 can be utilized in combination for accurately detecting all the desired parameters of the objects 16. However, it is understood that various other suitable methods can be utilized for detecting the desired parameters of the objects 16. Then, the sequence proceeds to step 104.

In step 104, the process-determining module 24 of the controller 22 receives input data, e.g. the measured parameters of the objects 16, from the sensors 14. The process-determining module 24 generates a queue of detected objects with their respective measured parameters. Thereafter, the process-determining module 24 proceeds to step 106 for separately analyzing each object and its respective parameters.

In step 106, the process-determining module 24 considers the next detected object in the queue for the current cycle. At the beginning of a cycle, this object is the first object listed in the queue. In this step, the process-determining module 24 determines whether the detected object requires identification by the controller 22.

Specifically, the process-determining module 24 compares the measured parameters of the detected object and compares those parameters to a series of archived parameters. These archived parameters and various other information are located within an object identification list that is stored in the object-tracking module 26. The archived parameters are associated with an object previously detected by the sensors. In this way, the process-determining module can determine whether the detected object has been previously detected and identified by the controller 22. However, it will be appreciated that various other methods can be utilized for determining whether the detected object has been previously identified by the PCS system 12. If the process-determining module 24 determines that the detected object has not been previously detected and identified, then the sequence proceeds to step 108.

In step 108, the process-determining module 24 actuates the object-tracking module 26 to perform a subroutine for identifying the object 16 and updating the object identification list. Then the sequence proceeds to step 110.

However, if in step 106 the process-determining module 24 determines that the detected object has been previously detected and identified, then the process-determining module 24 immediately proceeds to step 110. In another embodiment, the process-determining module 24 actuates the object-tracking module 26 to perform the subroutine for storing data related to the detected object, e.g. the measured parameters, regardless of whether the object has been previously detected and identified.

In step 110, the process-determining module 24 determines whether the object-classifying module 28 has previously classified the object 16 into a predetermined category. Specifically, the process-determining module 24 searches an object classification list, which is stored in the object-tracking module 26, for a classification associated with the detected object. If the process-determining module does not find a classification corresponding to the object, then the sequence proceeds to step 112.

In step 112, the process-determining module 24 determines that the object requires classification and actuates the object-classifying module 28 to perform a subroutine for classifying the detected object 16 into a predetermined category. For example, the object-classifying module 28 can classify the detected object as a "non-threat" when the range, range rate, and the angle measurements indicate that the object, e.g. a third-party vehicle, is increasing its distance from the vehicle 18 and is located substantially far from the centerline 20 path of the vehicle 18. However, it is contemplated that the object-classifying module 28 can utilize the desired parameters for classifying the object into various other suitable categories as desired. Then, the sequence proceeds to step 116 described below.

However, if in step 110 the process-determining module 24 finds a classification associated with the detected object, then the sequence proceeds to step 114.

In step 114, the process-determining module 24 and/or the object-classifying module 28 determines whether the classification associated with the object is outdated or otherwise inaccurate and thus requires updating. This step can be accomplished by comparing the current measured parameters of the detected object with the previous classification and parameters associated with the object. For instance, the object's previous classification may indicate a "non-threat" situation, and its corresponding archived parameters can indicate that the object 16 was moving away from the vehicle 18. However, the current range, range rate, and angle measurements can indicate that the object has changed its direction toward the vehicle 18 at a substantially high speed. In that regard, the prior classification is outdated and requires the object-classifying module 28 to assign a new category to the object, e.g. "object requiring full-force airbag deployment." By that example or for any other reason that requires an updated classification, the sequence immediately proceeds to step 112.

However, if in step 114 the classification does not require updating, then the sequence proceeds to step 116.

In step 116, the process-determining module determines whether other detected objects remain in the queue for analysis. If other detected objects are listed in the queue, then the sequence returns to step 106.

However, if no objects remain in the queue, then the sequence proceeds to step 118. In other words, a complete cycle of image processing can require that the entire queue of objects 16 is processed.

Yet, in another embodiment, step 116 can be time restricted. Specifically, each cycle of image processing lasts for a predetermined amount of time regardless of whether any detected objects remain in the queue. In this regard, step 116 can be accomplished by requiring the process-determining module 24 to determine whether sufficient time remains in the cycle for processing the next object.

In step 118, the object identification list and the object classification list are stored in the object-tracking module 26. Then, the sequence proceeds to step 120.

In step 120, the controller 20 sends the most recent object classification list to the countermeasure system 30.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

The invention claimed is:

1. A pre-crash sensing system for a vehicle, comprising:
   at least one sensor repeatedly detecting at least one parameter of at least one object external to the vehicle; and
   a controller coupled to said at least one sensor;
   said controller selectively generating an object classification list for transmission to a safety countermeasure system;
   said controller comprising an object-tracking module, a process-determining module, and an object-classifying module;
   said object-tracking module storing an object identification list and said object classification list;
   said object identification list including a plurality of identities of previously detected objects as defined by a plurality of archived parameters;
   said process-determining module receiving said object classification list, said object identification list, and said at least one parameter of said at least one object;
   said process-determining module determining one of said at least one object being a previously unclassified object and said at least one object requiring an updated classification; and
   said process-determining module actuating said object-classifying module to classify said at least one object into a predetermined category and update said object classification list.

2. The pre-crash sensing system as recited in claim 1 wherein at least one parameter includes at least one of a height, a width, a depth, a range, a range rate, an angle, and a visual feature.

3. The pre-crash sensing system as recited in claim 1 wherein said at least one sensor includes at least one of a visual-imaging camera and an electro-magnetic wave-ranging device.

4. The pre-crash sensing system as recited in claim 3 wherein said visual-imaging camera is selected from the group consisting of a monocular camera and a binocular camera.

5. The pre-crash sensing system as recited in claim 3 wherein said electro-magnetic wave-ranging device is selected from the group consisting of a radar device, a lidar device, and a stereo camera pair ranging device.

6. A method for operating a pre-crash sensing system for a vehicle, comprising:
   utilizing at least one sensor for detecting at least one object located external to the vehicle;
   utilizing a controller for producing a queue of said at least one object; and
   utilizing said controller for individually determining that each of said at least one object requires that an object classification list is updated;
   said object classification list being stored in said controller;
   said controller coupled to said at least one sensor and intended to selectively generate an object identification list and said object classification list;
   said controller determining that said at least one object was previously detected and requires an undated classification;
   said object classification list for transmission to a safety countermeasure system.

7. The method as recited in claim 6 wherein utilizing said at least one sensor comprises:
   utilizing at least one of a visual-imaging camera and an electro-magnetic wave-ranging device for detecting at least one of a height, a width, a depth, a range, a range rate, an angle, and a visual feature associated with said at least one object.

8. The method as recited in claim 6 wherein individually determining that each of said at least one object requires that said object classification list is updated comprises:
determining that each of said at least one object has been previously classified.

9. The method as recited in claim 6 wherein individually determining that each of said at least one object requires that said object classification list is updated comprises:
determining that said at least one object is associated with an outdated classification.

10. The method as recited in claim 6 further comprising:
transmitting said object classification list to a safety countermeasure system of the vehicle.

11. A method for operating a pre-crash sensing system for a vehicle, comprising:
utilizing at least one sensor for detecting at least one object located external to the vehicle;
utilizing a controller for producing a queue of said at least one object; and
utilizing said controller for determining one of said at least one object being a previously unclassified object and said at least one object requiring an updated classification;
said object identification list and said object classification list being stored in said controller;
said controller coupled to said at least one sensor and intended to selectively generate said object identification list and said object classification list;
said object classification list for transmission to a safety countermeasure system.

12. The method as recited in claim 11 wherein utilizing said at least one sensor comprises:
utilizing at least one of a visual-imaging camera and an electro-magnetic wave-ranging device for detecting at least one of a height, a width, a depth, a range, a range rate, an angle, and a visual feature associated with said at least one object.

13. The method as recited in claim 11 wherein individually determining that each of said at least one object requires that said object classification list is updated comprises:
determining that each of said at least one object has been previously unclassified.

14. The method as recited in claim 11 wherein individually determining that each of said at least one object requires that said object classification list is updated comprises:
determining that said at least one object is associated with an outdated classification.

15. The method as recited in claim 11 further comprising:
storing at least one of an updated object identification list and an updated object classification list in an object-tracking module within said controller at the end of an image processing cycle.

16. A pre-crash sensing system for a vehicle, comprising:
at least one sensor detecting at least one object external to the vehicle; and
a controller coupled to said at least one sensor and selectively generating an object identification list and an object classification list;
said object classification list for transmission to a safety countermeasure system;
said controller producing a queue of said at least one object;
said controller determining that each of said at least one object individually requires that said object classification list is updated;
said controller executing a classification subroutine when said at least one object is omitted from said object classification list;
said classification subroutine classifying said at least one object into at least one predetermined category for updating said object classification list;
said object classification list stored in said controller.

17. The pre-crash sensing system recited in claim 16 wherein said controller determines that each of said at least one object individually requires that said object identification list is updated.

18. The pre-crash sensing system recited in claim 16 wherein said controller determines that said object classification list requires updating one time for each of said at least one object.

19. The pre-crash sensing system recited in claim 16 wherein said at least one sensor repeatedly detects said at least one object over a series of sensing cycles and said controller updates said object classification list the first time each of said at least one object is processed by said controller.

20. The pre-crash sensing system recited in claim 16 wherein said object classification list includes at least one previously classified object and at least one predetermined category.

21. The pre-crash sensing system recited in claim 16 wherein said controller bypasses a classification subroutine when said at least one object is included in said object classification list.

* * * * *